United States Patent [19]

Hargrave

[11] 4,389,805
[45] Jun. 28, 1983

[54] ELASTOMER FORMULATED FISHING PRODUCT

[76] Inventor: John C. Hargrave, 18010 S.W. Francis, Aloha, Oreg. 97005

[21] Appl. No.: 166,154

[22] Filed: Jul. 7, 1980

[51] Int. Cl.³ .............................................. A01K 95/00
[52] U.S. Cl. ................................................. 43/43.14
[58] Field of Search ................... 43/42.39, 43.1, 43.14, 43/44.89, 44.95, 44.96, 44.97

[56] References Cited

U.S. PATENT DOCUMENTS

| | | | |
|---|---|---|---|
| 1,766,532 | 6/1930 | Pflueger | 43/43.1 |
| 2,183,414 | 12/1939 | Smith | 43/43.1 |
| 2,313,647 | 3/1943 | Knill | 43/43.1 |
| 2,519,104 | 8/1950 | Blomgren | 43/44.97 |
| 2,522,191 | 9/1950 | Pillow | 43/44.96 |
| 2,985,981 | 5/1961 | King | 43/44.97 |
| 3,151,414 | 10/1964 | Hoerner | 43/44.97 |
| 3,405,476 | 10/1968 | Pumilio | 43/43.14 X |
| 3,557,486 | 1/1971 | Wright | 43/44.95 |
| 3,782,025 | 1/1974 | Kochevar | 43/43.1 |
| 3,820,270 | 6/1974 | La Force | 43/43.14 |

OTHER PUBLICATIONS

*Popular Science*, "12 Foolproof Ways to Rig a Fishline", Jul. 1965, vol. 187.

*Primary Examiner*—James G. Smith
*Attorney, Agent, or Firm*—William A. King

[57] ABSTRACT

A fishing product having a specific gravity greater than 1.04 but less than 4.00 is presented which includes a body formulated from an elastomer compounded with a gravity change additive dispersed throughout the body to stabilize buoyancy in water, mineral oil and crosslinking agents to prevent leaching of toxic materials. The product is adapted for connection with a fishing line by means of a swivel axially mounted in the sinker body and bonded thereto.

1 Claim, 4 Drawing Figures

ELASTOMER FORMULATED FISHING PRODUCT

BACKGROUND

This invention relates generally to fishing products and more particularly to sinkers designed to move along a body of water.

Known related art includes U.S. Pat. Nos. 2,605,576 of Young, Jr. on 8/5/52; 2,502,875 of Mortensen on 4/4/1950; 2,225,805 of Stevermer on 12/24/1940; 1,284,508 of Watson on 11/12/1918; 883,048 of Pflueger on 3/24/1908; and 769,356 of Reis on 9/6/1904.

A common deficiency of known sinkers is their inherent inability to move through water at a natural rate producing a natural bait action.

One group of known sinkers adopt a construction composed solely of lead utilizing the high specific gravity (11.35) of this material (Pb) to obtain a rapid submersion rate. Such construction inherently drags along the bottom, plowing, wedging and snagging thereby preventing a natural bait presentation and causing a high incidence of fishing gear loss. This construction is also objectionable because it flattens upon impact (highly malleable) as well as being prone to flaking and corrosion. It will be appreciated that these qualities cause dissipation of toxic lead ions; but, also cause sharp edges which exacerbate these problems by nicking and tangling fishing lines.

A second group of known sinkers have sought to avoid some of the deficiencies of an all lead (Pb) construction by adopting a composite construction having an elastomeric body into which a lead mass is inserted to give the resultant sinker a specific gravity ranging from about 5.00 to about 9.00. The uneven mass distribution of such sinkers, however, forces the adoption of non-spherical shapes in order to maintain desired orientation in the water, and, renders the device inherently incapable of stabilized buoyancy.

SUMMARY

This invention provides a spherical fishing sinker of a resilient, abrasion-resistant elastomer formulated with a gravity change additive dispersed throughout its body to stabilize buoyancy in water. The sinker includes a swivel axially mounted in the sinker for connecting same to a fishing line.

It has been determined that by adopting a spherical shape and by dispersing the gravity change additive throughout the sinker, the resultant device has stable buoyancy in water.

The gravity change additive includes fillers of inorganic finely divided material, such as powdered lead, zinc oxide, alumina filler or fine clays which is readily dispersed throughout the requisite elastomer and enhances the specific gravity of the elastomer to desired levels.

It has been further determined that the resultant specific gravity of the composite must be greater than 1.04 in order to permit same to submerge in fresh water and less than 4.00 in order to have a buoyancy (soft bouncing action) capable of producing a natural bait action. Optimum results have been obtained by arranging the proportion of the gravity change additive to other materials such as to obtain a specific gravity of 1.70. Given such construction, the resultant sinker submerges at an appropriate rate and maintains sufficient buoyancy to lift slightly under the force of relative movement between the sinker and water in combination with the soft bounce quality of the elastomer composite. The combined submergence and lift qualities of the present sinker creates a natural bait action and uniform progression as the sinker undergoes movement through water such as during trolling or in reaction to stream action.

It is also significant to place both a lubricant such as mineral oil and cross linking agents in the composite because this insures long life and significantly eliminates leaching.

It has still further been determined that live rubber is the optimum elastomer for the present sinker.

A primary object of this invention is providing a relatively uncomplex and durable, spherical fishing sinker which is capable of submerging and lifting when moved through water thereby producing both natural bait action and relatively uniform motion.

The foregoing object and other objects, features and advantages of this invention will be more readily understood upon consideration of the drawings and descriptions and claims which follow.

DRAWINGS

DETAILED DESCRIPTION

Turning now to the drawings, there is shown a spherical fishing sinker indicated generally by numeral 20, having a swivel 22 axially mounted therein for connecting sinker 20 to a fishing line 24.

Figure 1:
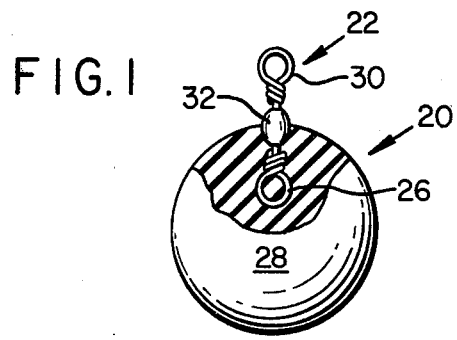
FIG. 1 is a cross section of an exemplary embodiment of the present sinker.
Figure 2:
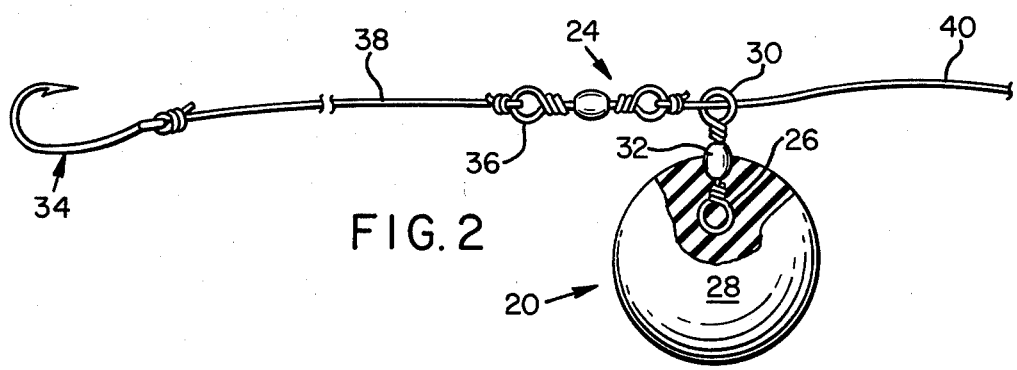
FIG. 2 is a plan view depicting an exemplary method of using the sinker of FIG. 1.

In a first embodiment (FIG. 2), swivel 22 is a black nickel (Ni) barrel sinker of selected size having a lower end 26 bonded to body 28 of sinker 20, upper end 30 in the form of a closed loop and an intermediate portion 32 inconnecting the ends such that the upper end can rotate relative to the lower end.

In use, fishing line 24 generally includes a lure 34 attached to a second swivel 36 by a leader line 38 of predetermined breaking strength. A heavier line 40 (main line) is also connected to the opposing end of the second swivel and passes freely through upper end 30 of swivel 22.

Figure 4:
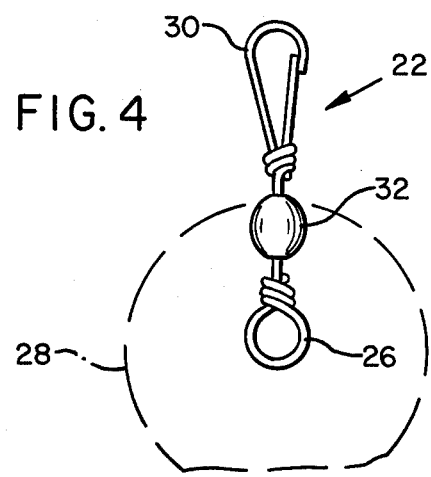
FIG. 4 is a cross section depicting an exemplary alternate embodiment of a swivel for the sinker of FIG. 1.

As shown in FIG. 4, swivel 22 could, in the alternative, have an upper end 30 in the form of an openable loop. Each of these swivels are commercially available through the U.S. firm known as the Berkely Company.

Figure 3:
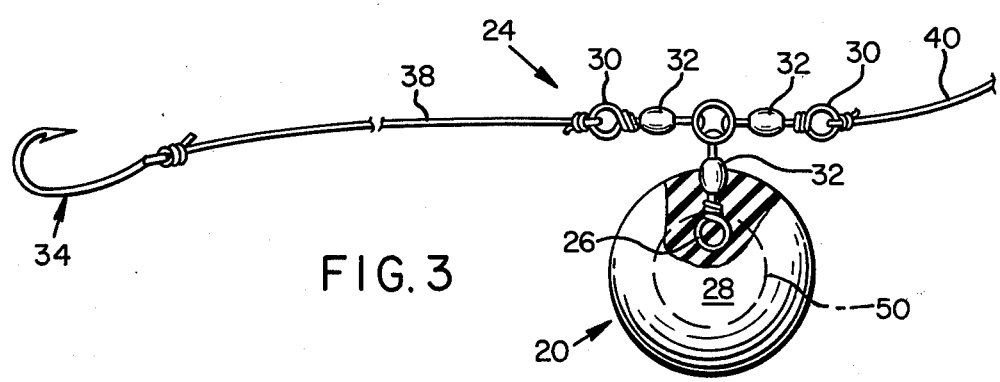
FIG. 3 is a plan view depicting an exemplary alternate method of using the sinker of FIG. 1.

In a second embodiment (FIG. 3), swivel 22 is a crossline, black nickel (Ni) swivel of selected size having a lower end 26 axially mounted in and bonded to body 28, an upper end 30 in the form of opposing closed loops and an intermediate portion 32 interconnecting the ends such that the opposing loops can rotate relative to both each other and to body 28. In this embodiment, leader line 38 is attached to one of the opposing loops and main line 40 is connected to the other opposing loop.

In the preferred embodiment, swivel 22 has its lower end 26 chemically bonded to body 28, using a significantly insoluble, high strength adhesive such as CA8 CYANOACRYLATE. The selected adhesive must continue to exhibit bonding properties after sinker 20 has been maintained in boiling water for at least seven minutes. It being understood that swivel 22 could, in the alternative, be intrinsically bonded to body 28.

Body 28 is of elastomer material selected from the group of live rubber, polysulfide, polychloroprene, ethylene-propylene, butylene polymers, polyurethane elastomers, styrene-butadiene, thermoplastic elastomers, polyisoprene, polyisolitzler, fluoro elastomers and silicone elastomers. It being expressly noted that such materials as neoprene inherently lack requisite bounce qualities.

EXAMPLE 1

A composite was used having 100 parts of styrene-butadiene, 50 parts of carbon black, 4 parts of zinc oxide, 5 parts of processing oil as lubricant, 2 parts of sulphur, being cured for 40 minutes at 160 degrees centigrade. The following engineering properties were observed: tensile strength, psi of 3060; percent elongation at break of 380; psi (300%) modulus of elasticity of 2410; and Shore A hardness of 57.

The following tables describes yet further examples.

| Polychloroprene | |
| --- | --- |
| Formulation | Parts |
| polychloroprene | 100 |
| carbon black or other colored filler | 30 |
| zinc oxide | 5 |
| magnesia | 4 |
| antioxidant | 2 |
| cure at | 30 minutes at 160° C. |
| Engineering Properties | |
| tensile strength, psi | 3000 |
| modulus of elasticity (300%), psi | 1500 |
| elongation at break, % | 610 |
| hardness, Shore A | 60 |

| Chlorosulfonated Polyethylene Elastomer | |
| --- | --- |
| Formulation | Parts |
| chlorosulfonated polyethylene* | 100 |
| magnesia | 20 |
| litharge | 20 |
| alumina filler | 15 |
| cure at | 30 minutes at 160° C. |
| Engineering Properties | |
| tensile strength, psi | 1900 |
| modulus of elasticity (300%), psi | 1700 |
| elongation at break, % | 330 |
| hardness, Shore A | 70 |

*Hypalon - Du Pont

Hardness and modulus properties of the elastomer are readily altered by changes in crosslink density and by incorporation of filters (gravity change additives) and plasticizers. Gravity change filters (additives) used are powdered lead, carbon black, zinc oxide or other inorganic finely divided material such as clay, calcium carbonate, metal oxides, aluminum silicates or whiting (white fillers). Optimum filler levels vary from about 20 parts to about 50 parts by weight per hundred parts of elastomer, being varied to obtain the desired specific gravity, which must be greater than 1.04 and less than 4.00 with 1.7 being an optimum choice.

Organic hues may also be included to give the desired hue. It being noted that black is preferred due to its non-reflective qualities, with light green being an alternate choice because of its low visibility in water.

Aside from the strength hardness, compressibility and rubber-like elasticity of sinker 20, good abrasion resistance (resistance to cracking, cutting or tearing) is essential. This can be optimized by selecting live rubber as the elastomer and adding mineral oil as a lubricant thereto. It is further noted that crosslinking agents must also be employed in order to achieve these qualities and to avoid potential leaching.

Although the present invention has heretofore been described as a fishing sinker, this procedure was followed for reasons of clarification only and not to limit the disclosure, it being appreciated that the disclosed article with suitable modification as to shape and color would also be useful for other fishing products such as lures. One such product would be to provide the body with a disc shape and a hook, coloring its left side red and its right side yellow.

The use of the terms in the foregoing descriptions were used for purposes of clear presentation only and not by way of limitation, it being understood that the scope of the invention is limited only by the claims which follow.

What is claimed is:

1. A fishing sinker comprising a spherical body of elastomeric material formulated with a gravity change additive dispersed throughout the body providing the sinker with a specific gravity between 1.04 and 4.00 and a swivel axially mounted in and bonded to the body for connecting the sinker to a fishing line.

* * * * *